Oct. 23, 1956 F. N. SCHWEND 2,767,907

READOUT APPARATUS FOR COMPUTING EQUIPMENT OR THE LIKE

Filed March 15, 1954 4 Sheets-Sheet 1

INVENTOR,
Fred N. Schwend
Fred N. Schwend

Oct. 23, 1956 F. N. SCHWEND 2,767,907

READOUT APPARATUS FOR COMPUTING EQUIPMENT OR THE LIKE

Filed March 15, 1954

4 Sheets-Sheet 2

INVENTOR,
Fred N. Schwend

Fred N. Schwend

Oct. 23, 1956 F. N. SCHWEND 2,767,907

READOUT APPARATUS FOR COMPUTING EQUIPMENT OR THE LIKE

Filed March 15, 1954 4 Sheets-Sheet 3

INVENTOR,
Fred N. Schwend

Fred N. Schwend

Oct. 23, 1956 F. N. SCHWEND 2,767,907

READOUT APPARATUS FOR COMPUTING EQUIPMENT OR THE LIKE

Filed March 15, 1954

4 Sheets-Sheet 4

INVENTOR,
Fred N. Schwend

Fred N. Schwend

United States Patent Office 2,767,907

Patented Oct. 23, 1956

2,767,907

READOUT APPARATUS FOR COMPUTING EQUIPMENT OR THE LIKE

Fred N. Schwend, El Monte, Calif., assignor to Clary Corporation, a corporation of California Application March 15, 1954, Serial No. 416,142

6 Claims. (Cl. 235—58)

This invention relates to computing equipment and has particular reference to read-out systems adapted to record or otherwise register, in intelligible form, amounts computed by electronic or electrical computing equipment.

Generally, such equipment registers data computed thereby, in the form of electrical, magnetic or like states. Such types of registration are not readily intelligible or capable of being sensed or analyzed by mechanical utilization devices. Therefore, suitable read-out systems must be provided to translate the data into useful information or control stimuli.

Also, although electronic counting and computing devices are available which are capable of registering amounts in the decimal numeral system, the majority of such equipment embodies counters or the like, capable of counting according to non-decimal systems, such as the binary or bi-quinary numeral systems.

Such non-decimal systems generally have certain advantages which make their use desirable. For example, the latter systems require fewer components or counting stages, resulting in simpler, less expensive and more reliable apparatus. However, since numeral data is generally represented in the decimal system, certain difficulties arise in understanding and dealing with a non-decimal system and is therefore desirable to translate non-decimal data obtained from computing equipment into decimal data so that the values may be more readily comprehended.

The principal object of the present invention is to provide a read-out system for translating non-decimal data registered by a counter, accumulator or storage device into decimal data and for registering such data.

Another object is to reduce to a minimum the time required to effect a combined read-out operation and translation of data from one numeral system to another.

Another object is to provide a read-out system including a device for translating data from one numeral system to another in which no time delay is necessary to effect such translation.

Another object is to provide a read-out system remotely controllable by a counter, accumulator, or storage register in which a minimum number of circuits are necessary to effectively control the read-out system.

The manner in which the above and other objects of the invention are accomplished will be readily understood in reference to the following specification when read in conjunction with the accompanying drawings wherein.

GENERAL ARRANGEMENT

Figures 1, 2:
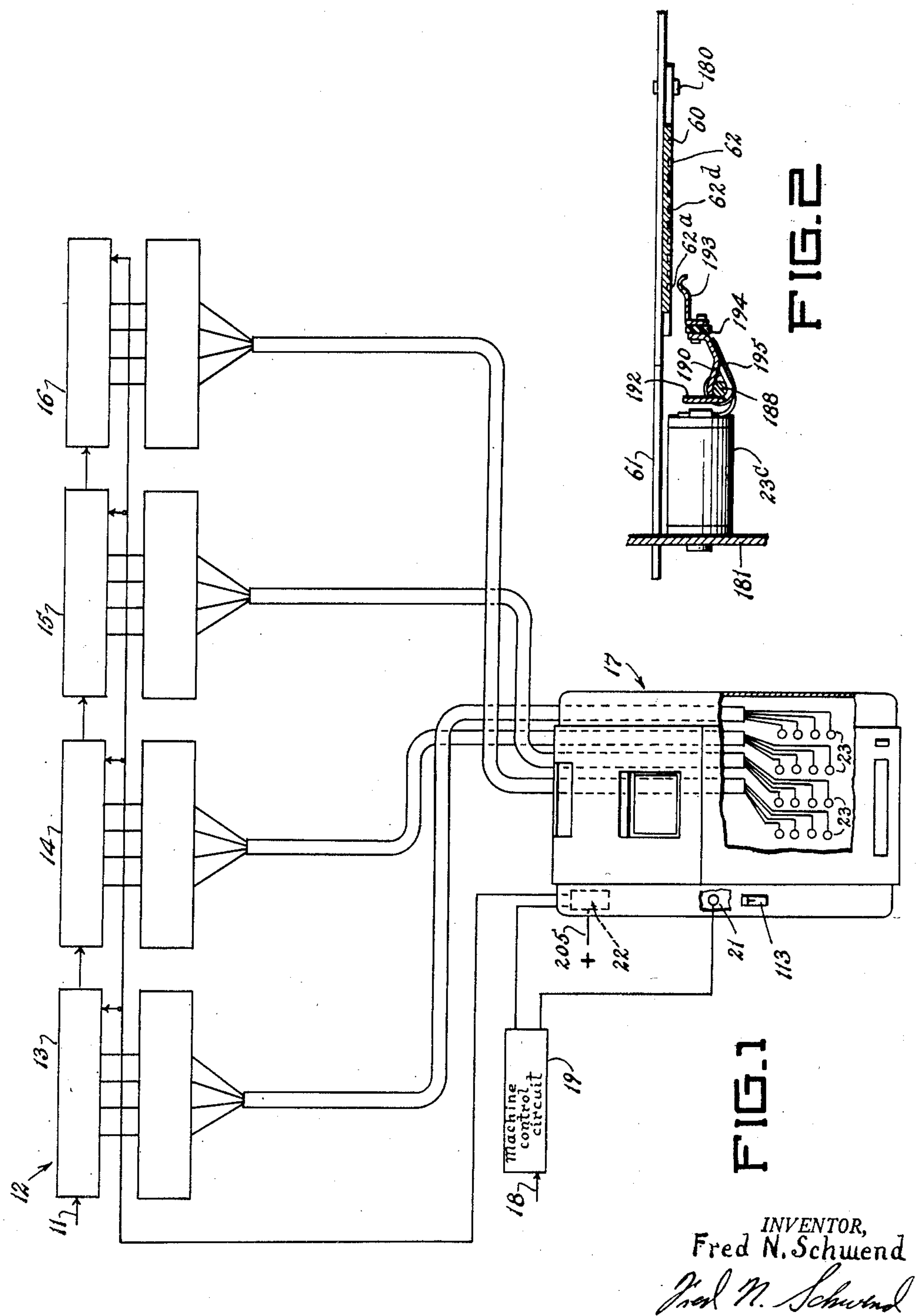
Fig. 1 is a general schematic view of a read-out system embodying the present invention.
Fig. 2 is a sectional plan view of one of the binary-decimal converting circuit devices and is taken along the line 2—2 of Fig. 3.

In order to first obtain a general understanding of the read-out system embodying the present invention, reference is had to Fig. 1 showing the various components of the system.

Pulses to be counted are applied over an input line 11 and are fed to an electronic counter generally indicated at 12. The latter comprises four counter decades 13, 14, 15, and 16 connected in cascade. Each of the latter is of the binary coded decimal type having four stages of binary or scale-of-two circuits capable of counting from zero to nine. Suitable circuit arrangements transfer a carryover unit or transfer pulse from one decade to the next upon accumulation of ten pulses therein. Also, provision is made to return a decade to zero upon accumulation of ten pulses therein.

A mechanical read-out machine, generally indicated at 17, is provided having a mechanical accumulator and a printing mechanism to be described hereafter.

The read-out machine 17 is cyclic in nature and whenever it is desired to determine and record in decimal form an amount registered in the counter 12, a signal pulse is applied to a signal line 18 to energize a machine control circuit 19. The latter effects energization of a solenoid, generally indicated at 21, to initiate a cycle of operation of the machine. Simultaneously, circuits through groups 23 of four electromagnets located in the machines, are conditioned to be energized by one or more stages of the respective counter decades, depending on the digitized condition of the counter at the time that the read-out operation is in effect.

As will be described in detail hereinafter, each group 23 comprises four electromagnets, each effective to place a respective brush in wiping contact with what I will term a matrix card 60 (Fig. 3) carried by an associated actuator rack 61. Each brush is effective to bridge one of a number of gaps or breaks formed in a series of parallel broken circuit conductors 62 on the card 60. These gaps are arranged in a particular pattern in accordance with the relationship between the binary and decimal numeral systems. When one or more activated brushes complete a circuit along the entire length of one of the bars, as an incident to forward movement of the associated rack 61, an arresting device generally indicated at 63 will be operated to arrest the rack. This will occur when the rack reaches a decimal numerical position representative of the binary registration found in the associated counter decade.

*Counter decade unit*

Although any of various forms of the counter decades operating on the binary or other non-decimal numeral principle may be used, the specific counter circuit illustrated herein, is similar to that disclosed in the patent to J. T. Potter, No. 2,538,152. Therefore, only a general description of this counter is considered necessary.

Figure 5:
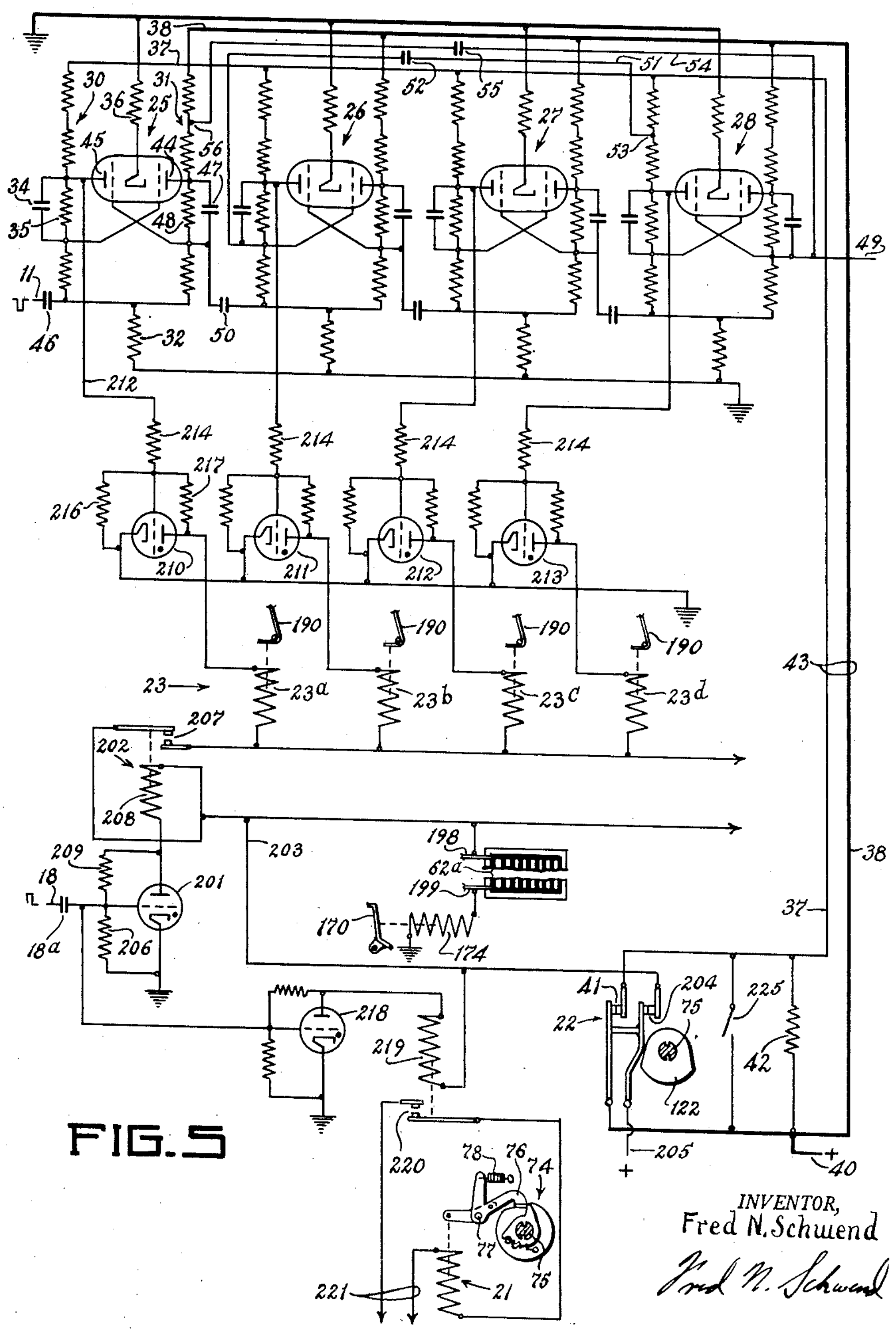
Fig. 5 is a circuit diagram of an electronic counter decade and circuits controlled thereby for controlling the read-out machine.

The units decade 13 is shown in circuit detail in Fig. 5 and it is to be understood that the remaining decades 14, 15, and 16 are similar in all respects.

Referring to Fig. 5, the counter decade comprises four bi-stable multi-vibrators stages 25, 26, 27, and 28, each including a dual triode vacum tube and a pair of right and left hand voltage divider circuits, like circuits 30 and 31, associated with respective triodes. Each pair of voltage divider circuits is connected at its lower end through a common resistor, like resistor 32, to ground.

The anode of each triode is connected to the grid of the opposite triode through a parallel connected capacitor and resistor, like capacitor 34 and resistor 35, the latter forming part of the respective voltage divider. The cathode of each tube is connected through a bias resistor, like resistor 36, to ground.

Anode potential is normally applied from two anode supply lines 37 and 38 to the upper end of respective ones of the left and right voltage dividers, i. e., 30 and 31. The anode supply line 37, forming part of a circuit 43, is directly connected to a source of positive potential 40. The other anode supply line 38 is connected to the supply source 40 through normally closed contacts 41 of the aforementioned machine controlled switch 22, thereby normally supplying equal potential to both voltage dividers in each stage and to all anodes of the decade.

A resistor 42 is connected across the anode supply lines 37 and 38 through the circuit 43 for resetting purposes, as will appear hereinafter.

Normally, in zero or standby condition, the right hand triode of each counter tube is in a conducting state and the left hand triode is in a non-conducting stage in accordance with the well known principle of multi-vibrators of the Eccles-Jordan type. Thus, in the zero condition of the decade, the right hand anodes, like anode 44, are at a relatively low potential whereas the left hand anodes, like anode 45, are at a relatively high potential.

Pulses to be counted are of a negative nature and are applied through the input line 11 and a coupling condenser 46 to the juncture of the lower ends of the voltage dividers 30 and 31 in the left hand or lowermost denominational counter stage 25. The leading edge of the first pulse lowers the potential of the right hand grid of the first counter stage 25 to a point below the tube cut-off level, thus raising the potential of the anode 44. This rise in voltage is applied through condenser 47 and resistor 48 forming part of the divider network 31, to the grid of the left hand triode of stage 25, thereby raising the latter to above cut-off and causing the left hand side of the tube to conduct.

The second pulse transmitted over line 11 will lower the potential of the grid of the left hand triode in stage 25 to reverse the condition of the latter back to its original state and in so doing will sharply lower the potential of anode 44, thereby transmitting a negative pulse through a coupling condenser 50 to the juncture of the lower ends of the voltage dividers in the second counter stage 26.

The various remaining counting stages of decade 13 are connected in a manner similar to that described above so that upon each second reversal of the previous stage a negative pulse will be transmitted to next higher order stage to reverse the condition thereof from one of its stable states to the other.

The natural sequence of circuit conditions effected in each counter decade will be found to occur in accordance with the binary progression 1, 2, 4, and 8. Thus, when any of the left hand triodes of the tubes in stages 25, 26, 27 and 28 are in conducting condition they represent the decimal values 1, 2, 4, and 8, respectively. When more than one left hand triode is in conducting condition, the decimal equivalent registered thereby is equal to the sum of the individual decimal values thereof.

Since there are four counting stages, the decade would normally continue to count until the count of sixteen is reached at which time it would be returned to its zero condition. However, in order to return the decade to zero condition at the count of ten, certain feed-back circuits are incorporated in the counter decade. These circuits comprise a line 51 and coupling condenser 52 connected from a point 53 on the left hand voltage divider of stage 28 to the connection for the right hand grid of the tube in stage 26. A second line 54 and condenser 55 are connected from the grid connection for the left hand triode in stage 28 to a point 56 on the right hand voltage divider 31 for the stage 25.

Although a drop in potential is applied along line 54 during each second reversal of the first stage 25 this drop is insufficient to affect the condition of stage 28. However, upon reception of the eighth pulse, the condition of stage 28 is reversed, raising the potential of the right hand triode and consequently causing conduction of the left hand triode in this stage. Stage 28 remains in this condition throughout the ninth count but upon reception of the tenth pulse, the anode 44 of stage 25 again drops in potential to send a negative pulse through the line 54 to drive the left hand triode in stage 28 below cut-off potential. This reverses the condition of stage 28 to its initial condition and transmits a negative pulse through a line 49 to the first stage of the next higher order decade.

Consequently, all stages in the decade 13 are returned to zero condition. However, in order to prevent reversal of the second stage 26 due to a transfer of a negative pulse from stage 25 thereto at the count of ten, the line 51, at this time transmits a positive pulse from points 53 to the right hand grid of the triode in stage 26. This action prevents reversal of stage 26.

*Read-out machines*

The read-out machine 17 is basically similar in construction to that found in the well-known Clary Adding Machine which is disclosed and claimed in Patent No. 2,583,810, issued to R. E. Boyden on January 29, 1952. The accumulating mechanism of this machine is disclosed and claimed in Patent No. 2,472,696, issued to E. P. Drake on June 7, 1949.

Since the basic structure of the machine is disclosed in the above patents only those portions thereof which relate to the present invention or which have been modified to embody part of the present invention will be described in detail. Reference may therefore be made to the above patents for a complete disclosure of the machine. However, it is to be understood that the invention is not limited to the particular machine disclosed.

The read-out machine includes a series of the aforementioned denominationally arranged actuating racks 61. The latter are supported for independent fore and aft movement by transversely extending shafts 65 and 66, embraced by guide slots 67 and 68, respectively, in each of the racks. The shaft 66 is stationarily supported in the machine frame (not shown) but the shaft 65 (Figs. 3 and 8) is moved fore and aft of the machine once during each machine cycle between its full line position and its dotted line position 65*a*. In order to guide the shaft 65 in its movement, the latter is provided with rollers, one of which is shown at 69, at opposite ends thereof and movable along slots 69*a* formed in machined frame plates, one of which is shown at 64.

The drive shaft 65 is yieldably connected to the racks by pairs of opposed drive pawls 70 and 71 pivotally mounted on shaft 65 and carrying rollers 72 which normally engage in lateral depressions formed at the closed end of each rack slot. A spring 73 extends between tails of each pair of pawls 70 and 71 to urge the rollers 72 outwardly and normally into the lateral slot depressions, thus coupling the racks to the shaft 65 until the former are arrested as will be described hereinafter. At such time the rollers are forced out of the lateral depressions and move along the edges of the slots 67 as the shaft 65 continues through an invariable stroke.

The machine is driven by an electric motor (not shown) through a cyclically operable clutch generally indicated at 74, (Fig. 5), the driven side of which is connected to a main drive shaft 75 (Figs. 3, 5, 6, 7, and 8). The clutch 74 is controlled by a clutch dog 76 pivotally supported at 77 and urged clockwise by a spring 78 into its illustrated position wherein it normally maintains the clutch in disengaged position.

Means are provided for advancing the rack drive shaft 65 from its full line illustrated position to its dotted line position 65*a* during the first part of a machine cycle, i. e., during approximately the first 180° of rotation of the drive shaft 75, and returning the same during the latter half of the cycle. For this purpose, a pair of complementing cams 79 and 80 (Figs. 8) are keyed on the shaft 75 and are engaged by rollers 81 and 82, respectively, mounted on a cam follower 83. The latter is fulcrumed on a frame pin 84 and is connected by a link 85 to a bifurcated arm 86. This arm is attached to one end of a rock shaft 87 and is pivotally mounted in the frame in the machine, and embraces the aforementioned roller 69 carried on one end of the shaft 65. An arm (not shown) similar to arm 86 is secured to the opposite end of the shaft 87 for the purpose of embracing a roller similar to that of 69 on the opposite end of the shaft 65 so as to cause parallel movement of this shaft during its forward and return stroke.

The machine accumulator, generally indicated at 88 (Fig. 3) comprises denominationally arranged accumulator gears 90 independently and rotatably mounted on an accumulator shaft 92. As described in detail in the aforementioned Drake and Boyden patents, the accumulator is raised or lowered to mesh the accumulator gears 90 with upper or lower rack gear sections 93 and 94 formed on the various racks 61, depending on type of operation performed.

During a normal read-out operation, the accumulator is raised to mesh the gears 90 with the upper rack sections 93 and is maintained in such position during the forward advance of the racks. Thereafter, the accumulator is returned to its neutral position and held therein during return of the racks. During totalling operations, however, the accumulator is lowered to mesh the gears 90 with the lower rack sections 94 and is held in such position during the forward advance of the racks and returned to its neutral position during the return of the racks.

Figures 6, 7, 8:
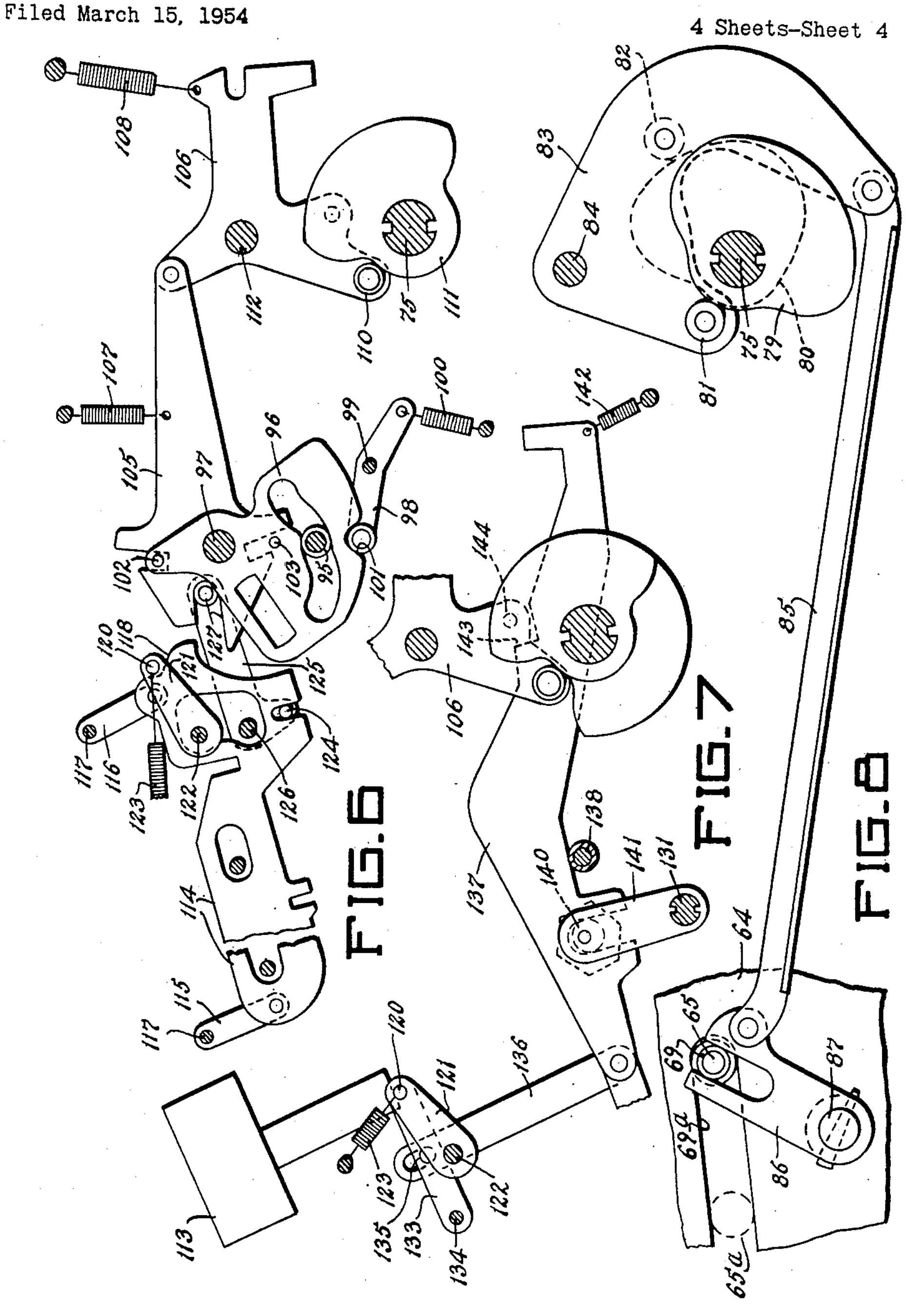
Fig. 6 is a side view illustrating the accumulator positioning controls.
Fig. 7 is a side view illustrating part of the totalling controls.
Fig. 8 is a side view illustrating the rack drive mechanism.

Mechanism is provided for selectively raising or lowering the accumulator shaft 92 and gears 90. For this purpose, the accumulator shaft 92 is provided with rollers on opposite ends thereof, one of which is shown at 95 (Fig. 6). The latter is embraced by a cam slot formed in a pair of box cams, one of which is shown at 96. Such box cams are suitably connected together by means (not shown) and are pivotally supported on frame pins, one of which is shown at 97.

The cam 96 is normally held in its illustrated neutral position by a centralizer 98 pivoted at 99 and urged clockwise by a spring 100 to normally engage a centralizer notch 101 formed on the lower periphery of the cam to thereby normally maintain the accumulator in its neutral position.

The box cam 96 carries a pair of pins 102 and 103 located on opposite sides and equi-distant from the pivot pin 97. The pins 102 and 103 are adapted to be selectively engaged by a double hook member 105 pivotally connected to a three-armed cam follower 106. The hook member 105 is normally held in its upper illustrated position by a tension spring 107 so as to embrace the upper pin 102.

Figures 3, 4:
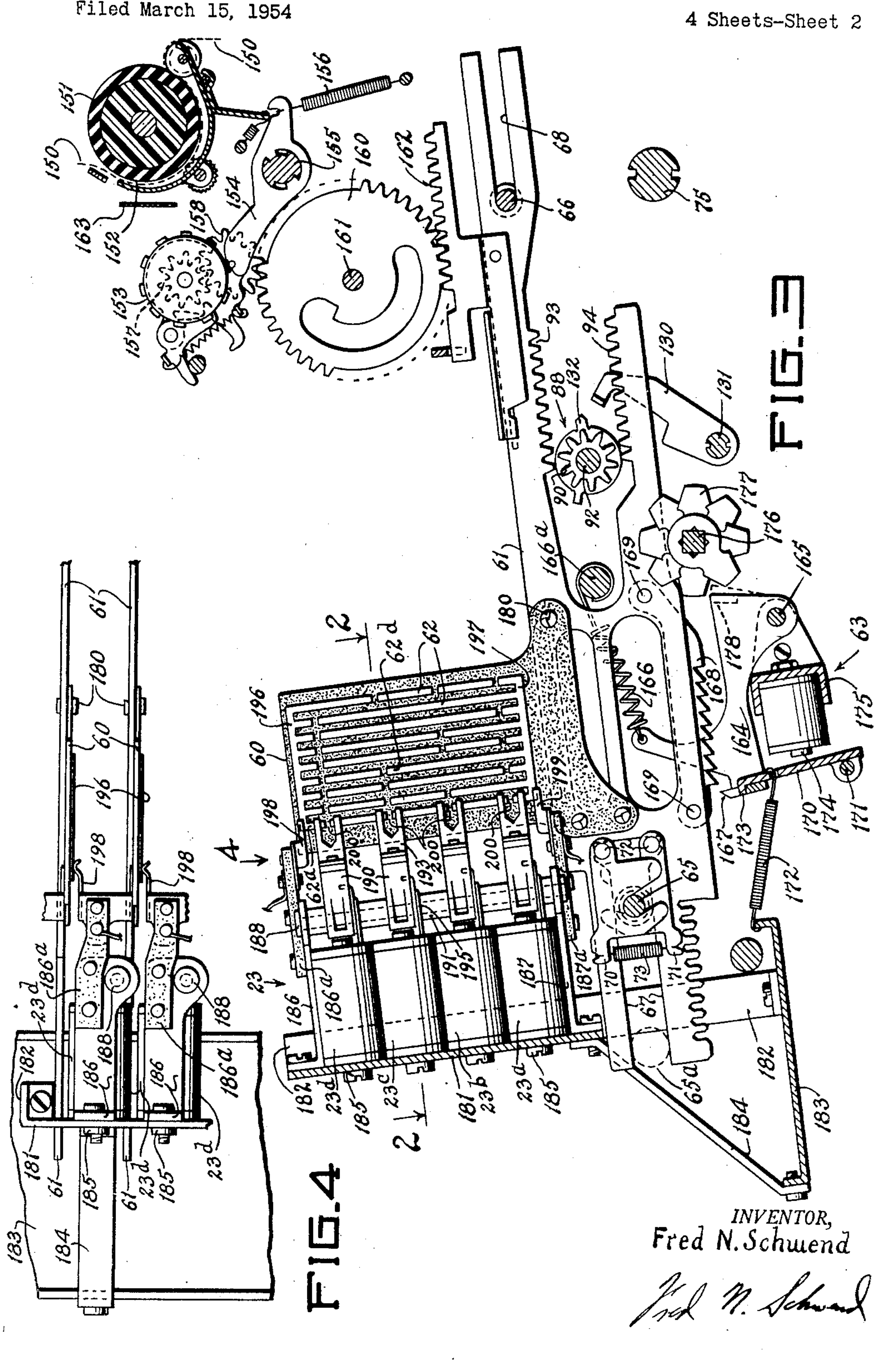
Fig. 3 is a longitudinal sectional view of the read-out machine, illustrating the accumulator, printer and binary-decimal converting device.
Fig. 4 is a plan view taken in direction of the arrow 4 of Fig. 3.

The cam follower 106 is normally held in its counterclockwise rocked position, as illustrated, by a tension spring 108 extending between the cam follower and a suitable frame stud to maintain a roller 110 on one arm thereof against the periphery of a cam 111 keyed on the aforementioned drive shaft 75. The cam 111 has a high portion extending substantially half way about the periphery thereof whereby to rock the cam follower clockwise about the pivot pin 112 at the start of a machine cycle and to hold the same in such position until the rack drive shaft 65 has advanced to its dotted line position 65*a* (Fig. 3). Accordingly, the hook member 105 will be effective to likewise rock the box cam 96 clockwise and raise the accumulator so as to effect additive entries into the accumulator.

Means are provided for lowering the hook member 105 in response to initiation of a totalling operation of the machine by depression of a total bar 113 (Figs. 1 and 7). For this purpose, an accumulator positioning control bar 114 is provided, being supported for longitudinal movement by parallel links 115 and 116 pivotally supported by frame pin 117. The control bar has an inclined camming surface 118 underlying a pin 120 carried on an arm 121 (see also Fig. 7) fulcrumed on a frame pin 122 and urged upwardly by a tension spring 123. The pin 120 also underlies the stem of the total bar 113.

The control bar 114 is coupled by a pin and slot connection 124 to a bell crank 125 fulcrumed at 126 and coupled through a pin and slot connection 127 to the hook member 105. Thus, upon depression of the total bar 113, the control bar 114 will be advanced, rocking the bell crank 125 to lower the hook member 105 into embracement with the pin 103. Accordingly, during the ensuing totalling cycle, the box cam 96 will be rocked counter-clockwise to lower the accumulator into mesh with the lower rack sections 94 of the racks.

During a totalling operation the accumulator gears are returned in a clockwise direction by the racks 61 to zero registration wherein they are arrested by a series of zero stop arms 130. The latter are keyed on a rockable shaft 131 (see also Fig. 7) and are adapted to block zero locating ears 132 carried on respective ones of the accumulator gears 90. Normally the blocking levers are held out of the paths of the zero locating ears 132 by a spring (not shown). For the purpose of setting the various blocking arms 130 into the paths of the zero locating ears 132, the aforementioned pin 120 underlying the total bar 113 is also pivotally connected to one end of a cross link 133 which, for the purpose of the present disclosure, may be assumed to be fulcrumed at 134 at its opposite end. The link 133 is coupled at an intermediate point through a pin and slot connection 135 to a vertical link 136. The latter is connected to the forward end of a floating link 137 which is slidably fulcrumed on a frame pin 138. The link 137 is coupled through a pin and slot connection 140 to an arm 141 keyed to the aforementioned stop lever supporting shaft 131.

Normally, when the total bar 113 is in its undepressed position, as illustrated, a tension spring 142 extending between a suitable frame pin and the rear end of the floating link 137, holds the latter in its illustrated position about the fulcrum pin 138 to locate a shoulder 143 thereof below the path of movement of a pin 144 carried by the aforementioned cam follower 106. However, upon depression of the total bar, the link 136 will rock the link 137 about pin 138 to position the shoulder 143 directly in the path of the pin 144 on the cam follower 106. Accordingly, when the cam follower 106 is rocked clockwise the pin 144 will advance the link 137, rocking the arm 141 and shaft 131 to position of the various blocking arms 130 in the path of the ears 132 of the accumulator gears 90. Therefore, during the advance of the racks 61, the accumulator gears will be rotated clockwise until they reach their zero positions at which time their ears will arrest against the blocking arms 130.

*Printer*

The various values represented by numerical positions to which the racks 61 are moved during read-out or totalling operations are printed on a paper tape 150 which is fed from a suitable supply roll (not shown). The tape passes around a rotatable platen 151, which is incrementally advanced during each cycle of the machine to carry the tape to a printing station 152 where the aforementioned values are printed thereon.

The printer comprises a series of printing wheels, one of which is shown at 153, there being one wheel operatively associated with each of the racks 161. Each wheel has equally spaced around the periphery thereof a series of type ranging in value from "0" to "9" and each of these wheels is so entrained with its respective rack 61 that it will print a digit corresponding in value to the numerical position to which the rack is advanced during the first half of a machine cycle.

Each printer wheel 153 is rotatably mounted on a separate lever 154 which is loosely keyed on a printer control shaft 155. A spring 156 tensioned between the lever and a suitable part of the machine frame urges the lever clockwise, tending to carry the respective printing wheel into contact with the tape 150, being normally restrained from so doing by the control shaft 155.

Each printing wheel has integrally secured thereto a gear 157 permanently meshed with an idler gear 158 also rotatably mounted on the associated lever 154. Except during a printing operation which occurs when the racks are located at forwardly advanced positions, the levers 154 are held in their illustrated positions by the shaft 155 to maintain the gears 158 in mesh with idler gears 160. The latter are independently and rotatably mounted on a fixed support shaft 161 and are maintained in continual mesh with offset rack sections 162 carried by the various racks 61.

After the racks 61 have been differentially advanced to different numerical positions and the printing wheels 153 positioned accordingly, the shaft 155 is rocked clockwise, by means not shown, permitting the various springs 156 to advance the printing levers 154 to record, through a printing ribbon 163, the values registered thereon.

*Read-out controls*

In accordance with the present invention, each of the actuator racks 61 is arranged to be arrested in any of different numerical positions by the aforementioned electromagnetically operated arresting device 63. The latter comprises a pawl 164 in each order pivotally supported upon a fixed cross rod 165. A tension spring 166 extends between each pawl and a cross rod 166*a* to urge the pawl clockwise tending to raise a pawling tooth 167 thereof into engagement with one of a series of teeth formed on toothed bar 168 secured by rivets 169 to the associated rack 61. Normally, however, each pawl 164 is maintained out of engagement with its toothed bar by a latch 170 pivotally supported on a cross rod 171 and urged counter-clockwise by a tension spring 172 to maintain a latching tip 173 thereon in engagement with the bottom of a notch formed in the pawling tooth 167. The latch 170 also forms the armature of an electromagnet 174 suitably secured in a channel member 175 extending across the machine and suitably secured to the frame thereof.

Energization of the various electromagnets 174 occurs during the forward advancement of the racks, except in those orders in which the value "9" is registered in which case the magnet will not be energized, enabling the respective rack to advance through nine full increments of travel.

During the latter half of a machine cycle and while the various racks 61 are being returned to their home positions illustrated in Fig. 3, a tens transfer shaft 176 is rotated through one complete revolution as described in the aforementioned Boyden and Drake patents. Mounted on the shaft 176 is a helically arranged series of cams 177, each aligned with an ear 178 formed on a respective pawl 164. Therefore, during return of the racks, the cams 177 will engage and rock the pawls 164 counter-clockwise into their ineffective positions wherein they will be retained by the latches 170.

Secured to each rack 61 by rivets 180 is a plate, card or base element 60 of electrical insulating material such as plastic having integrally bonded or otherwise attached to one surface thereof a thin layer of metal forming the configuration shown in Fig. 3 to provide the various aforementioned broken vertical conductors 62.

The groups 23 of electromagnets and brushes controlled thereby for cooperating with the cards 60 are supported on a frame plate 181 extending across the machine and suitably secured at opposite ends thereof to upstanding brackets 182. The latter are secured to a cross brace 183 forming part of the machine frame and are held in rigid relation thereto by an inclined brace 184.

In each denominational order of the machine, the four electro-magnets i. e., 23*a*, 23*b*, 23*c*, and 23*d*, of the respective group 23, are secured by screws 185 to the cross plate 181 with their axes extending parallel and longitudinally of the machine.

Brackets 186 and 187 are likewise secured to the frame plate 181 directly above and below each group of magnets. These brackets, in each order, support the opposite ends of a vertical pivot rod 188. A set of four brush holders 190 are pivotally mounted on each rod 188 and are held in spaced relation by sleeves 191 interposed therebetween. Each brush holder has a laterally extending tail 192 (Fig. 2) located directly behind the core of an aligned one of the electromagnets, as 23*c* in Fig. 2, thus forming an armature for the same.

A bifurcated brush 193 of brass or other electro-conductive material, is secured to each brush holder 190 through a piece of insulating material 194, the brush and brush holder being suitably bonded to the opposite sides of the piece 194 so as to electrically insulate the brush from the holder. A tension spring 195 is wound around a portion of reduced diameter formed at the top of each sleeve 191 and extends between each brush holder 190 and the respective electromagnet to normally hold its brush 193 in the position illustrated in Fig. 2. Thus such brushes are normally out of contact with the surface of the card 60.

Upon energization of any of the magnets 23*a*, etc., the respective brush holder 190 will be actuated thereby, forcing its brush 193 against the surface of the card 60 to bridge any aligned gaps or breaks 200 in the vertical conductor strips 62 as the latter move past the row of brushes 193 during forward advance of the associated racks.

It will be noted that the various conductor strips 62 are joined at their tops and bottoms by horizontally extending conducting strips 196 and 197 respectively, the latter being continuously engaged by brushes 198 and 199, respectively, mounted on blocks of insulating material 186*a* and 187*a*, which in turn, are suitably secured to the brackets 186 and 187. Thus, the brushes 198 and 199 are continuously in circuit with the upper and lower ends of all of the conductor strips 62 regardless of the position of the racks. It should be understood that the strips 62 are spread apart distances equal to the distances between the different numerical positions of the racks. Also, the strips 62 are so located that when a rack is in its home or zero position the leftmost strip is directly under the row of brushes 193.

As described hereinbefore, the four electromagnets 23*a*, 23*b*, 23*c*, and 23*d* in each order of the machine are controlled by respective counter stages in the associated counter decade in accordance with the binary registration in such decade. These magnets therefore represent the decimal values of 1, 2, 4, and 8, respectively. If a counter decade registers the binary value "0000," initiation of a read-out operation would result in all of the magnets 23*a* to 23*d* in the proper order of the machine being energized, whereas, for example, if the counter decade registered the binary value "0110" only the magnets 23*a* and 23*d* would be energized.

Describing now, the circuit for initiating a read-out operation and for causing the various stages of each counter decade to control the corresponding groups 23 of magnets in the machine, the read-out signal line 18 is connected through a coupling capacitor 18*a* to the igniter of a cold cathode gas tube 201, preferably of the type known as the RCA No. 5823. The latter has its cathode connected directly to ground and its anode connected in circuit with the winding of a relay 202, line 203, and normally closed contacts 204 of the aforementioned switch 22 to a source 205 of positive potential. A voltage divider comprising a resistor 206 located in the ignitor-cathode circuit and a resistor 209 located in the ignitor-anode circuit of tube 201, normally biases the ignitor of this tube to a potential just below its triggering point. Upon application of a positive signal over line 18, the tube 201 will conduct to energize relay 208 thus closing normally open contacts 207 to apply positive potential from line 203 to the lower end of each of all of the various electromagnets 23*a*, etc.

Each electromagnet, i. e., 23*a*, is directly connected at its upper end in circuit with the anode of a respective one of four buffer tubes 210, 211, 212, and 213, preferably of the aforementioned 5823 type.

The ignitor of each of the latter tubes is connected through an isolating resistor, like resistor 214, and line, like line 212, to the left-hand anode, like anode 45, of a respective counter stage. A voltage divider comprising bias resistors, like resistors 216 and 217, in the ignitor-cathode and ignitor-anode circuits of each tube normally biases the ignitor to a point just below the firing point. Therefore, as the relay 208 is energized, one or more of the buffer tubes will conduct, depending upon the condition of their associated counter stages to thereby energize one or more of the electromagnets 23*a*, etc.

As noted hereinbefore, application of a signal pulse over line 18 is effective to initiate a cycle of operation of the read-out machine 17. For this purpose, line 18 is also connected through capacitor 18*a* to the ignitor of a normally non-conducting gas tube 218, also preferably of the No. 5823 type. The circuit connections for the tube 218 are similar to those for tube 201, whereby application of a signal pulse over line 18 will cause conduction of this tube. However, the anode of tube 218 is connected in circuit with the winding of a machine control relay 219, and the aforementioned normally closed contacts 204 to the positive potential source 205.

Energization of the relay 219 will close its normally open contacts 220 located in circuit with the aforementioned clutch control solenoid 21 across a power circuit 221, thus rocking the clutch dog 76 counter-clockwise to cause engagement of clutch 174.

It will be recalled that when each rack 61 is in its home position, as shown in Fig. 3, the various brushes 193 are aligned with the first conductor strip 62*a*, the latter having four breaks 200 located directly under each of the brushes 193. Therefore, if the associated counter decade is in a zero condition wherein the ignitors of all buffer tubes 210 to 213 are maintained above their firing potential, application of an anode potential through the relay 202 as an incident to initiation of a read-out operation will energize all of the electromagnets 23*a*, 23*b*, 23*c*, and 23*d* to engage all of the brushes 193 with the surface of the card 60. The brushes will thus bridge all of the breaks 200 and thereby complete a circuit from the supply source 205 through contacts 204, line 203, brush 198, conductor strip 62*a*, brush 199 and rack stop magnet 174. This action will take place before appreciable movement of the rack drive mechanism and accordingly the rack arresting pawl 164 will be tripped to prevent movement of the associated rack from its zero registering position.

As the machine passes through approximately the 180° point of its cycle, i. e., just as the rack drive shaft 65 commences return to its initial full-line position in Fig. 3, and before rotation of the cam shaft 176, a cam 122 will open the contacts 41 and 204, dropping relays 202 and 219 to deenergize all of the magnets 23*a*, 23*b*, 23*c*, and 23*d*. Opening of contacts 41 will throw the resistor 42 in circuit with the anode supply line 37 causing a drop in the anode potential of the left hand anodes, like anode 45, of all of the counter tubes so as to render the left hand triodes of all tubes non-conducting. Thus, the counter returns to a zero condition.

In the event a counter decade should register, for example, the binary number "0011" equivalent to the decimal number 3, the buffer tubes 210 and 211 would, upon initiation of a read-out operation, remain in a non-conducting condition while the tubes 212 and 213 would be rendered conductive. Accordingly, the magnets 23*a*, 23*b* would remain deenergized while the electro-magnets 23*c* and 23*d* would be energized. Therefore, the associated rack 61 would advance through three increments and as the brushes 193 for the energized magnets 23*c* and 23*d* bridge the two breaks in the fourth conductor strip 62*d*, the circuit through the associated rack stop magnet 174 will be completed to arrest the rack in its number 3 position.

It will be noted that the breaks 200 in the various conductor strips 62 of each matrix card 60 are so arranged that the breaks will be bridged to complete a circuit through the stop magnet 174 when the rack reaches a decimal position representing the corresponding binary registering condition of its counter decade.

The following table indicates the relationship between the binary condition of each counter decade, the electromagnets 23*a*, etc., energized and the corresponding decimal position to which the associated rack is advanced during a read-out operation.

| Counter decade condition | Electromagnets energized | Numerical position to which rack advanced |
|---|---|---|
| 0000 | 23*a*, 23*b*, 23*c*, 23*d* | 0 |
| 0001 | 23*b*, 23*c*, 23*d* | 1 |
| 0010 | 23*a*, 23*c*, 23*d* | 2 |
| 0011 | 23*c*, 23*d* | 3 |
| 0100 | 23*a*, 23*b*, 23*d* | 4 |
| 0101 | 23*b*, 23*d* | 5 |
| 0110 | 23*a*, 23*d* | 6 |
| 0111 | 23*d* | 7 |
| 1000 | 23*a*, 23*b*, 23*c* | 8 |
| 1001 | 23*b*, 23*c* | 9 |

It will be noted that no conductor strip is provided for the number "9" position of the rack 61. Such is not necessary since energization of electromagnets 23*b* and 23*c* only will be ineffective to complete a circuit through any of the conductor strips 62 and consequently, the rack will be permitted to advance through its full travel of nine increments to register the value "9."

If it is desired not to reset the counter to zero as an incident to each read-out operation but to register and/or record accumulated totals counted by the counter, a normally open switch 225 connected in shunt across the resistor 42 is closed to prevent resetting of the various counter decades.

Although I have described my invention in detail in its preferred embodiment and therefore have utilized certain specific terms and languages herein, it is to be understood that the present disclosure is illustrative rather than restrictive and that certain changes and modifications may be resorted to without departing from the spirit or scope of the claims appended hereto. For example, counter decades operating according to numeral systems other than the binary system may be used in which case the number of electromagnets, similar to electromagnets 23*a* to 23*d*, may be varied in number and the arrangement of the matrix cards 60 may be rearranged accordingly.

In the appended claims, the term "registering element" is intended to apply to any element, such as the printing wheel 153 or accumulator gear 90 which may be set to register, by its position, any one of several numeral digits.

Having thus described the invention, what I desire to secure by United States Letters Patent is:

1. In a computing system, the combination, with a counter having a plurality of counting stages; of a registering element differentially settable to different registering position, means comprising a differential actuator for said element; means for advancing and thereafter retracting said actuator, means including an electromagnetic device for arresting said actuator during advancement of said actuator, a circuit for said electromagnetic device comprising a plurality of circuit connectors having differing numbers of circuit breaks therein; said conductors being electrically connected in parallel with each other, a plurality of break bridging brush devices adapted to close respective ones of said breaks in any one of said conductors, means for relatively moving said conductors in synchronism with said actuator and in sequence past said brush devices, means including individual circuits connected between said counting stages and respective ones of said brush devices for concomitantly positioning one or more of said brush devices in or out of wiping contact with said conductors, and means operable during retraction of said actuator for disabling said circuits.

2. In a computing system, the combination, with a counter having a plurality of counting stages; of a registering element differentially settable to different registering positions, means comprising a differential actuator for said element, means for advancing said actuator, means comprising an electromagnetic device for arresting said actuator; a circuit for said electromagnetic device comprising a plurality of circuit conductors carried by said actuator and electrically connected in parallel with each other, said conductors extending transversely to the direction of movement of said actuators and spaced apart distances equal to the distances between adjacent numerical positions to which said actuator is movable, a plurality of break closing devices normally aligned with one of said conductors and adapted to close respective ones of the breaks in any one of said conductors, and circuit means controllable by said counter stages for controlling respective ones of said break closing devices.

3. In a computing system, the combination, with a counter having a plurality of counting stages; of a registering element differentially settable to different registering positions, means comprising a differential actuator for said element, means for advancing and thereafter retracting said actuator, means including an electromagnetic device for arresting said actuator during advancement thereof, a circuit for said electromagnetic device comprising a plurality of circuit conductors carried by said actuator and electrically connected in parallel with each other; said conductors extending transversely to the direction of movement of said actuators, a plurality of break closing devices normally aligned with one of said conductors and adapted to simultaneously close respective ones of the breaks in any one of said conductors as the latter are sequentially moved past said break closing devices, circuit means controllable by said counter stages for controlling respective ones of said break closing devices, and means operable during retraction of said actuator for disabling said circuit means.

4. In a computing system, the combination with a multi-decade counter, each decade of said counter comprising a plurality of stages representing a decimal denomination of a numerical system other than the decimal system, of a multi-denominational recording device, means comprising differential actuators for differentially actuating the different denominations of said recording device, means for advancing said actuators, means comprising electromagnetic devices for arresting said actuators; circuits for respective ones of said electromagnetic devices, each of said circuits comprising a plurality of circuit conductors connected in parallel with each other and carried by a respective one of said actuators; said conductors having differing numbers of circuit breaks therein, arranged in accordance with the relation between said numerical system and the decimal system, a plurality of break closing devices adapted to close respective ones of the breaks in any one of said conductors during movement of said actuators therepast, and circuit means controlled by said counting stages for controlling respective ones of said break closing devices.

5. In a computing system, the combination with a multi-decade counter, each decade of said counter comprising a plurality of stages representing a decimal denomination of a numerical system other than the decimal system, of a multi-denominational recording device, means comprising differential actuators for differentially actuating the different denominations of said recording device; means for advancing said actuators, means comprising electromagnetic devices for arresting said actuators, circuits for said electro-magnetic devices, each of said circuits comprising a plurality of current conductors connected in parallel with each other and carried by respective ones of said actutors; said conductors extending transversely to the direction of movement of said actuators and having differing numbers of circuit breaks therein located in differing positions relative to each other in accordance with the relation between said numerical system and the decimal system, a plurality of break closing devices adapted to close respective ones of the breaks in any one of said conductors during movement of said actuator therepast, and circuit means controlled by said counting stages for controlling respective ones of said break closing devices.

6. In a computing system, a read-out device comprising the combination of a recording device differentially settable to different recording positions, means comprising a differential actuator for said recording device, means for advancing said actuator, a device for arresting said actuator, an electromagnetic device for controlling said arresting device, a body of insulating material carried by said actuator, a circuit for said electromagnetic device comprising a plurality of elongated conductors carried by said body and extending transversely to the direction of movement of said actuator and electrically connected in parallel with each other, said conductors having differing numbers of circuit breaks spaced serially there along, a plurality of brushes adapted to bridge said breaks, means supporting said brushes for wiping contact with said conductors upon movement of said actuator, and means for selectively causing one or more of said brushes to wipe said conductors.

References Cited in the file of this patent

UNITED STATES PATENTS

| | | |
|---|---|---|
| 1,916,987 | Peirce | July 4, 1933 |
| 2,533,242 | Gridley | Dec. 12, 1950 |